United States Patent
Wei et al.

(10) Patent No.: US 12,212,487 B2
(45) Date of Patent: Jan. 28, 2025

(54) LAN SYSTEM, METHOD AND UNIT SUPPORTING DYNAMIC SELF-ADAPTIVE NETWORK CONFIGURATION

(71) Applicant: Chengdu Vantron Technology Co., Ltd., Sichuan (CN)

(72) Inventors: Bo Wei, Sichuan (CN); Song Luo, Sichuan (CN); Wei Feng, Sichuan (CN); Junlan Duan, Sichuan (CN)

(73) Assignee: Chengdu Vantron Technology Co., Ltd., Chengdu (CN)

( * ) Notice: Subject to any disclaimer, the term of this patent is extended or adjusted under 35 U.S.C. 154(b) by 434 days.

(21) Appl. No.: 17/588,293

(22) Filed: Jan. 30, 2022

(65) Prior Publication Data

US 2022/0247672 A1    Aug. 4, 2022

(30) Foreign Application Priority Data

Feb. 1, 2021    (CN) .......................... 202110141128.X

(51) Int. Cl.
*H04L 12/28* (2006.01)
*H04L 45/00* (2022.01)
*H04L 45/02* (2022.01)

(52) U.S. Cl.
CPC .............. *H04L 45/26* (2013.01); *H04L 45/02* (2013.01); *H04L 45/22* (2013.01)

(58) Field of Classification Search
CPC ......... H04L 45/26; H04L 45/02; H04L 45/22; H04L 41/0823; H04L 41/0816; H04L 45/16; H04L 45/28; H04L 45/74
See application file for complete search history.

(56) References Cited

U.S. PATENT DOCUMENTS

2018/0302270 A1*  10/2018  Schreter ............. H04L 41/0677
2020/0287834 A1*   9/2020  Ramanathan ........ H04L 69/324

FOREIGN PATENT DOCUMENTS

CN    101335701 A   * 12/2008
CN    102340840 B   *  6/2014

OTHER PUBLICATIONS

International Workshop on Wireless AD-HOC Networks (IWWAN) 2004; Authors: Yusuke Sakurai and Jiro Katto; Title: AODV Multipath Extension using Source Route Lists with Optimized Route Establishment; Uploaded on May 20, 2014, DOI: 10.1109/IWWAN.2004.1525542—Source: IEEE Xplore. (Year: 2004).*

* cited by examiner

*Primary Examiner* — Edan Orgad
*Assistant Examiner* — Hidayat Dabiri

(57) ABSTRACT

The present invention discloses a LAN system, method and unit supporting dynamic self-adaptive network configuration. Through the integration of self-adaptive dynamic routing protocol with various nodes of network, the source node broadcasts and sends a message containing destination node information, and the intermediate node searches the destination node information in its connection state sheet and returns to the source node or adds its node information into the message and sends to other intermediate nodes based on the searching results, the intermediate node will modify its routing list and open the routing transfer function. The source node and the destination node will configure their routing lists respectively with the gateway and corresponding network interfaces through which the network segment of other node is reached to establish a routing connection. The system can automatically configure the network, and greatly decrease its dependence on the central node, increasing stability and reliability.

10 Claims, 7 Drawing Sheets

LAN SYSTEM, METHOD AND UNIT SUPPORTING DYNAMIC SELF-ADAPTIVE NETWORK CONFIGURATION

CROSS-REFERENCE TO RELATED APPLICATION

The present application claims the benefit of Chinese Patent Application No. 202110141128.X filed on Feb. 1, 2021, the contents of which are hereby incorporated by reference.

FIELD OF THE INVENTION

The invention relates to the technical field of network communications, and more particular to a LAN system, method and unit supporting dynamic self-adaptive network configuration.

BACKGROUND OF THE INVENTION

Currently, the mainstream LANs are configured based on a central node. For example, one LAN may have one or more routers, to which other devices are connected, and the communications between the devices are forwarded by the router nodes. When one LAN needs to communicate with another, a central node (router, gateway) is provided to forward. However, for LAN networking, the routing rules, address translation rules and other network configuration information of each device manually for the central node are always needed to configure by a network engineer beforehand. Most mainstream LAN networking methods are adopted to construct a similar topological structure as shown in FIG. 1. It can be seen from the figure that, due to the huge dependence on a central node, when the central node fails, the entire network based on the mainstream LAN networking methods and data transmission methods will become paralyzed in case of failure. For example, nodes A and F in FIG. 1 are used as the routers or gateways, and when they fail, the entire network cannot work. Moreover, the devices behind the router are invisible to other devices, so a WAN device cannot locate them. Although this can be solved by NAT technology and the routing rules, the routers still need to be configured beforehand, resulting in compromised flexibility, i.e., the routing device nodes cannot change with the network state of other devices. For example, Node G in FIG. 1 can access to Node C by setting the NAT rules or other routing rules, such as RIP and SPF, via Node A or Node F, but if the network configuration of Node C changes, Node G cannot access to Node C anymore because it cannot detect the network state change of Node C. Nowadays, with the rapid development of mobile Internet, the devices adopted have more mobile physical positions, making the traditional LAN networking methods and data transmission methods become less intelligent. Therefore, a method with high flexibility to self-adaptively configure the parameters of each network node based on the physical network connection state is in urgent need to satisfy the data exchange demands of network with constantly changing topological structure.

BRIEF SUMMARY OF THE INVENTION

In order to solve the problem of inflexible LAN configuration method, the present invention provides a LAN system, method and unit supporting dynamic self-adaptive network configuration, to self-adaptively configure the parameters of each network node according to the physical connection state of the network, and dynamically plan the routing of data transmission, thus satisfying the data exchange demands of network with constantly changing topological structure.

To achieve the above purpose, the present invention provides the following technical solutions:

a dynamic routing method supporting dynamic self-adaptive network configuration for LAN is characterized in that a source node generates and broadcasts a routing request message containing a device serial number information at a destination node, and the intermediate node forwards the message and locates a destination node, to establish a routing from the source node to the destination node; or a source node generates and broadcasts a resource request message containing a destination file ID, and an intermediate node forwards the message and locates a destination node containing the destination file, to establish a routing from the source node to the destination node containing the destination file, the intermediate node includes at least two network interfaces and is connected to at least two nodes through the network interfaces;

if multiple paths are available between the source node and the destination node, for the same request message of the same session, one node will process the earlier message and discard the later one;

when routing is successfully established, a node forming the routing, if disconnected, will send a disconnection reminder and re-establish a new routing between the source node and the destination node.

Further, the intermediate node forwards the message and locates the destination node in the following steps:

S101, after receiving the routing request message, the intermediate node searches its own connection state sheet, if no destination node is found, adds the serial number information of its own device, and forwards the routing request message to other nodes connected to the intermediate node, or sends endpoint message to the source node if no other nodes are connected to the intermediate node; the connection state sheet includes the IP address and MAC address of each network port of the current node, and the device serial number and IP address of the node connected to each port;

S102, if a destination node is found when it searches its own connection state sheet, the intermediate node configures its own routing and sends a routing confirmation message to a previous intermediate node in the direction of the source node;

S103, the intermediate node receives the routing confirmation message, configures its own routing, and forwards the message to the previous intermediate node in the direction of the source node;

S104, when an intermediate node in connection with the source node receives the routing confirmation message, it configures its own routing and sends routing completion message to an intermediate node in the direction of the source node and the destination node, and the intermediate node forwards the message, until the destination node receives the routing completion message;

S105, after receiving the routing completion message, the source node and the destination node configure their own routing;

in the steps of the intermediate node forwarding the message and locating the destination node, if routing establishment fails due to an error, the node with error will send an establishment failure message.

Preferably, the intermediate node forwards the message and locates the destination node containing the destination file in the following steps:

S201, after receiving the resource request message, the intermediate node searches its own shared resource list, if no destination file is found, adds the serial number information of its own device, and forwards the resource request message;

S202, if a destination file is found when a node searches its own shared resource list, the node is the destination node, and the network information of the destination node, the intermediate node, and the source node is written into a routing confirmation message and sent to the previous intermediate node in the direction of the source node;

S203, the intermediate node receives the routing confirmation message, configures its own routing, and forwards the message to the previous intermediate node;

S204, when an intermediate node in connection with the source node receives the routing confirmation message, it configures its own routing and sends routing completion message to an intermediate node in the direction of the source node and the destination node, the intermediate node forwards the message, until the destination node receives the routing completion message;

S205, after the source node and the destination node receive the routing completion message, the source node configures its own routing to ensure network communication with the destination node and obtain the desired file.

Further, the shared resource list includes the unique file ID and path of the file shared over the network by the node, the unique file ID is the hash code of the file, and the resource request message is REQ_DEVICE_BY_RES, which contains the token, type, identification of the file under resource request, device serial number at the source node, IP address of the source node, serial number of the device sending the message and device serial number at the intermediate node that the message passes; the token of resource request message is generated as follows: when a node initiates a file request, a session ID will be generated; the session ID is obtained by taking the first 12 digits of the result of hash calculation for a text concatenated by an intermediate value obtained from md5 algorithm of the user ID and password with the device serial number at the source node and the destination file ID; the token is obtained by concatenating the session ID and the timestamp, in which the first 12 digits are the session ID, and last 4 can be obtained from a reversible calculation for the timestamp.

Preferably, the step of sending the disconnection reminder and re-establishing the new routing between the source node and the destination node is as follows:

when the source node detects though heartbeat that the destination node is no longer reachable, it actively broadcasts a device disconnection message, and re-establishes the routing from the source node to the destination node or from the source node to the destination node containing the destination file according to the above method; or when a node in direct connection with the disconnected node detects through heartbeat or hardware that the destination node is disconnected, it actively broadcasts a device disconnection message; after receiving the broadcast, the source node re-establishes the routing from the source node to the destination node or from the source node to the destination node containing the destination file according to the above method.

Further, the routing request message is REQ_DES_DEVICE, which contains the token, type, device serial number at the destination node, device serial number at the source node, IP address of the source node, serial number of the device sending the message and device serial number at the intermediate node that the message passes;

the routing confirmation message is ROUTE_CONF, which contains the token, type, device serial number at the destination node, IP address of the destination node, port number of the destination node, device serial number at the source node, IP address of the source node, and serial number of the device sending the message;

the routing completion message is ROUTE_READY, which contains the token, type, device serial number at the destination node, IP address of the destination node, port number of the destination node, device serial number at the source node, IP address of the source node, port number of the source node, and serial number of the device sending the message;

the device disconnection message is DEVICE_DISCONNECT, which contains the token, type, serial number of the device sending the message, device serial number at the destination node, IP address of the destination node, device serial number at the source node, and IP address of the source node;

the endpoint message is NO_REQ_ENDPOINT, which contains the token, type, serial number of the device sending the message, device serial number at the destination node, and device serial number at the source node;

the establishment failure message is RESP_FAIL, which contains the token, type, serial number of the device sending the message, failure error code, device serial number at the destination node, and device serial number at the source node.

Further, each of the source node, the destination node and the intermediate node generates token for the message to be sent and extracts the token of the received message for verification; the token is generated as follows: when a node initiates a session, a session ID will be generated; the session ID is obtained by taking the first 12 digits of the result of hash calculation for a text concatenated by an intermediate value obtained from md5 algorithm of the user ID and password with the device serial number at the source node and the device serial number at the destination node; the token is obtained by concatenating the session ID and the timestamp, in which the first 12 digits are the session ID, and last 4 can be obtained from a reversible calculation for the timestamp; the verification is implemented as follows: when receiving a message, a device can tell which session it belongs to by comparing the information in the session ID, and determine whether the message exceed the time limit based on the timestamp in the token, thus to determine the validity of the message.

Further, the configuration of one's own routing is as follows: the port reaching the IP network segment of the destination node and the IP address of the port, or the next-hop port reaching the IP network segment of the destination node and the IP address of the next-hop port, and the port reaching the IP network of the source node and the IP address of the port, or the next-hop port reaching the IP network segment of the source node and the IP address of the next-hop port;

the connection state sheet includes the IP address and
MAC address of each network port of the current node,
and the device serial number and IP address of the node
connected to each port; the connection state sheet is
obtained by sending a message of obtaining the connection state sheet, the message of obtaining the connection state sheet is
REQ_DEVICE_ROUTE, which contains the token,
type, serial number of the device sending the message,
and device serial number at the destination node; the
device under the request of the connection state sheet
sends a message of responding connection state sheet to
the request node after receiving the message, the message of responding connection state sheet is
RESP_DEVICE_ROUTE, which contains the token,
message type, serial number of the device sending the
message, device serial number at the source node,
device IP address at the source node, device port
number at the source node, and device network interface list; the device network interface list contains the
network interface type, IP address, serial number of the
device connecting to the network interface, and the IP
address of the connected device.

Based on the same concept, the present invention provides a LAN unit supporting dynamic self-adaptive network configuration, comprising a physical device and a software system; the physical device supports the network interface, and the software system is equipped with an operating system supporting TCP/IP protocol family; and characterized by supporting the dynamic routing method supporting dynamic self-adaptive network configuration for LAN as mentioned above.

Based on the same concept, the present invention provides a LAN system supporting dynamic self-adaptive network configuration that is connected by traditional LAN topological structures. In the LAN system, any of the network nodes is the LAN unit supporting the dynamic self-adaptive network configuration as mentioned above.

In conclusion, due to the above technical solutions, the present invention has the following beneficial effects:

1. The method of the present invention can be used to self-adaptively configure the network parameters of each related node in the network according to the physical network connection state, configure the connection state sheet as required, and set the next-hop address reaching a network segment, thus to satisfy the data exchange demands of network with constantly changing topological structure. In the whole process, no interference of technical personnel is required for manual routing configuration of the gateways and routers.
2. The system automatically configures network according to the actual data transmission demands and the physical connection state of network devices, and each related network node configures its own network parameters, so there is no preset central node. Therefore, the system is decentralized system, which significantly reduces its dependence on central node, and increases its stability and reliability.
3. The system can support multiple network interfaces, greatly improving the easiness of device networking and internet access.

BRIEF DESCRIPTION OF THE DRAWINGS

The drawings described here are used to provide a further understanding of the embodiments of the present invention, which forms a part of the application rather than a limitation to the embodiments of the present invention. In the attached picture.

DETAILED DESCRIPTION OF THE PREFERRED EMBODIMENTS

Figure 1:
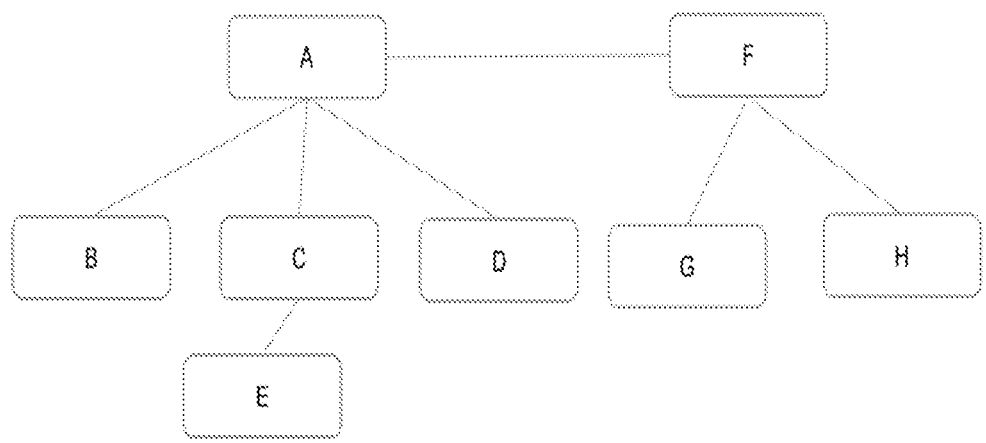
FIG. 1 is a typical topological structure diagram of LAN.

The invention is further described in combination with embodiments, but the following embodiments should not be construed as limitation to the scope of the above subjects of the invention. Technologies realized based on the invention shall fall within the scope of the invention.

Embodiment 1

A LAN system supporting dynamic self-adaptive network configuration is constructed based on the traditional topological structure of LAN. Any network node in the system is the LAN unit supporting dynamic self-adaptive network configuration as described below. The network nodes of the system are physically connected, such as through network cable, optical cable or wireless network of the same frequency band. According to the prior art, each physical interface connection of the node device will be simulated as a network interface, the network interface will be assigned a corresponding IP address, and each network interface will be assigned an independent port number to monitor command requests. Each physical interface will simulate the network card based on the prior art. For example, a USB is based on RNDIS technology, a Bluetooth is based on BT PAN technology, and WLAN and traditional Ethernet network cards are standard network devices. The network interfaces mentioned in the present invention refer to various network interfaces that can provide network connection, including Ethernet interface, virtual USB network interface based on RNDIS and other technologies, BT network interface based on BT PAN protocol and WLAN wireless network interface.

A LAN unit supporting dynamic self-adaptive network configuration includes physical device and software system.

The physical device supports the above various network interfaces, and the software system is equipped with a mainstream operating system, supporting TCP/IP protocol family and self-adaptive dynamic routing protocol—DRP. The self-adaptive dynamic routing protocol—DRP is realized through the self-adaptive dynamic routing protocol components. The unit at each node in the LAN system initiates the DRP Service daemon during system initialization and creates the self-adaptive dynamic routing protocol components, including a state machine unit, an interface connection monitoring unit and a token management unit;

the state machine unit is responsible for managing each state of the node device; each state will generate or receive and analyze specific protocol messages, process network state change events, and switch the state according to the network connection state of the node and the received and sent messages; the rules for processing messages in each state are different; the node device creates an independent state machine according to the session; each state machine only processes the message of the corresponding session, which can be judged by token;

the token management unit generates token information, adds it to the sent message, and verifies the token of the received message, which is detailed as follows: when a node initiates a DRP session process, it will randomly generate a session ID; the session ID is obtained by taking the first 12 digits of the result of hash calculation for a text concatenated by MD5 result of the user's token information (user ID+passwd) with the device serial numbers at the source node and the destination node (src_sn and des_sn); the token is obtained by concatenating the session ID and the timestamp; the first 12 digits are the session ID, and the last 4 can be obtained from a reversible calculation for the timestamp:

Token=substring12(MD5(MD5(userID+passwd)+
    src_sn+des_sn))+*R*(timestamp);

when receiving a message, a device can tell which session it belongs to by comparing the command information in the session ID, and determine whether the message exceed the time limit based on the timestamp, thus to determine the validity of the message;

the interface connection monitoring unit manages the state of all supported network interfaces of the node, and generates and updates the connection state sheet; after the operating system completes the generation of network interface and IP allocation, the interface connection monitoring unit generates a connection state sheet, which includes the IP, MAC, monitoring port and device serial number of each network interface of the node, and the serial number and IP address of the device connected to each network interface.

In the prior art, for devices directly connected to each other in the same network segment, if the port and device serial number information has not been manually input to the other node beforehand, one node needs to actively send the relevant configuration to the other node, so that the other node can acquire the device serial number, and IP address, MAC address and port number of the network interface. Therefore, a method for generating and updating the connection state sheet is provided as follows:

the device directly connected to each other in the same network segment broadcasts the device serial number, network interface name, IP address, MAC address and port number through UDP broadcast, and the broadcast port is 7777; the node device monitors the UDP broadcast of its network segment according to the network segment where the device network card is located, and the monitor port is 7777.

When a node (node X, for example) sends a routing request message through a network interface, it does not carry specific port information, but a node (node Y, for example) directly connected to the network port of the node (node X) can acquire the name, IP address, MAC address, port number and device serial number of the network interface connected to the node X through the UDP broadcast sent by the node X. Therefore, the node Y establishes or updates the connection state sheet to record the connection information of node X directly connected to it. Similarly, the node X can acquire the name, IP address, MAC address, port number and device serial number of the network interface of the node Y directly connected to it through the UDP broadcast sent by the node Y, so as to establish or update the connection state sheet. This is the premise of the method of the present invention.

The generated or updated connection state sheet can be obtained by sending a REQ_DEVICE_ROUTE message, and transmitted in JSON format. The device serial number is the unique identification of the node device. Each device in LAN must have a serial number, which is composed of 16 hexadecimal digits. The premise of this embodiment is that the device serial number at the destination node requiring communication is known.

The above state machine unit, interface connection monitoring unit and token management unit cooperate with each other to support the following method supporting dynamic self-adaptive network configuration for LAN.

Figure 2:
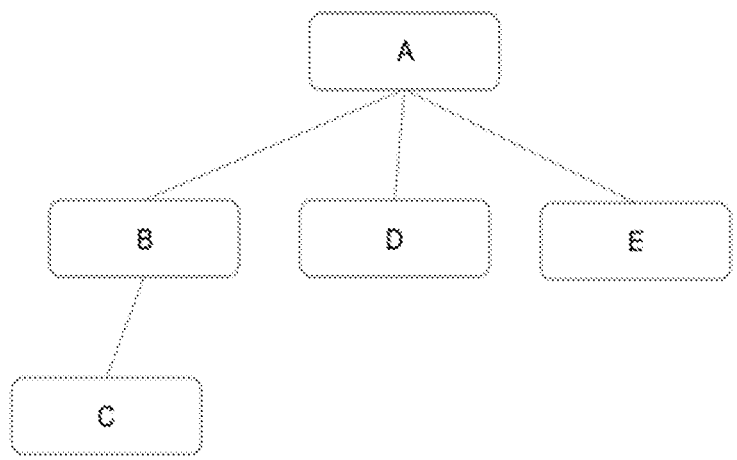
FIG. 2 is a topological structure diagram of LAN in embodiment 1 of the present invention.

In the dynamic routing method supporting dynamic self-adaptive network configuration for LAN, a source node sends a routing request through broadcast, an intermediate node forwards the message, and locates a destination node. Each node configures its own routing, and establishes the routing from the source node to the destination node. As shown in FIG. 2, a source node A needs to communicate with a destination node C, whose IP address and connection state are unknown, but the device serial number is known as 34762ab641c347e1. The source node A, a intermediate node B, the destination node C, a leaf node D and a leaf node E are all PCs supporting DRP self-adaptive dynamic routing protocol, the device serial number at the source node A is 64672ab641c647ec, and the device serial number at the intermediate node B is 54671ad641aa58ce;

the USB interfaces of the source node A and the intermediate node B are connected with a USB wireless network card. A LAN connection is established between the source node A and the intermediate node B through the wireless network card by using the method of the prior art. The IP address of the USB wireless network card of the source node A is 192.168.42.20 and the port number is 6666; the IP address of the USB wireless network card of the intermediate node B connected to the node A is 192.168.42.32 and the port number is 6666;

the intermediate node B and the destination node C are connected through Ethernet cable. The IP address of Ethernet port of the intermediate node B is 192.168.43.10 and the port number is 5555; the IP address of Ethernet port of the destination node C connected to the node B is 192.168.43.33 and the port number is 5555;

the source node A and the leaf node D are connected through Ethernet cable, and the source node A and the leaf node E are interconnected through WLAN. The IP address of Ethernet port of the source node A is 192.168.40.2, and the port number is 5555; the IP address of WLAN port of the source node A is 192.168.30.1, and the port number is 4444;

the routing from the source node A to the destination node C is established in the following steps:

S301, the source node A initiates a message broadcast in the form of a routing request message REQ_DES_DEVICE, which includes the device serial number at the destination node C, and the device serial number and IP address of the source node A. The message is transmitted to the next nodes B, D and E connected to the source node A through its network interfaces.

The specific contents of the above routing request message are:

```
{"message": {"token": "43742a2641b347e1", "type":
"REQ_DES_DEVICE",
"des_device": {"des_sn": "34762ab641c347e"}
"src_device": {"src_sn": "64672ab641c647ec", "src_ip":
"192.168.40.20"},
"sn": "64672ab641c647ec"}}.
```

S302, the nodes B, D and E, after receiving the broadcast, detect whether there have the destination node C in their connection state sheets. The nodes D and E are leaf nodes without other endpoint connections, and they send endpoint message NO_REQ_ENDPOINT to the source node A. The specific contents of the endpoint message sent by the leaf node D are as follows, in which 84672ad641ca47ed is the device serial number at the leaf node D;

```
{"message": {"token": "43742a2641b3472d", "type":
"NO_REQ_ENDPOINT",
"des_device": {"des_sn": "34762ab641c347e1"}, "sn":
"84672ad641ca47ed"}}.
```

The intermediate node B detects that a network interface in its connection state sheet is connected to the node C, then the intermediate node B modifies its own routing sheet and enables the network forwarding function to configure the port and IP reaching the IP network segment of the destination node C and the port and IP reaching the IP network segment of the source node A, so that the network card of the intermediate node B can implement forwarding, and communication between the source node A and the destination node C is realized through the intermediate node B, and then S304 is proceeded. The routing configurations of the intermediate node B are as follows:

192.168.42.0/24 via 192.168.42.32 dev usb0;
192.168.43.0/24 via 192.168.43.10 dev eth0.

S303, after successful configuration, the intermediate node B sends the routing completion message ROUTE_READY to the source node A and the destination node C respectively, which contains the IP, port and device serial number of the source node A and the IP, port and device serial number of the destination node C. The specific contents of the message are as follows:

```
{"message": {"token": "43742a2641b34522", "type":
"ROUTE_READY",
"src_device": {"src_sn": "64672ab641c647ec", "src_ip":
"192.168.42.20", "src_port": "6666"},
```

-continued

```
"des_device": {"des_sn": "34762ab641c347e1",
"des_ip": "192.168.43.33", "des_port": "5555"}, "sn":
"54671ad641aa58ce"}}
{"message": {"token": "43742a2641b34726", "type":
"ROUTE_READY",
"src_device": {"src_sn" : "64672ab641c647ec", "src_ip":
"192.168.42.20", "src_port": "6666"},
"des_device": {"des_sn": "34762ab641c347e1",
"des_ip": "192.168.43.33", "des_port": "5555"}, "sn":
"54671ad641aa58ce"}}.
```

The destination node C will configure the routing according to the received message to ensure the establishment of network communication with the source node A, and configure the next-hop IP address and port reaching the IP network segment of the source node A. The specific configuration is as follows:

192.168.42.0/24 via 192.168.43.10 dev eth0.

The source node A configures the next-hop IP address and port reaching the IP network segment of the destination node C. The specific configuration is as follows:

192.168.43.0/24 via 192.168.42.32 dev usb0.

After routing configuration, existing application layer protocols such as RTSP and HTTP can be used to communicate with the destination node C.

S304, after routing configuration, the source node A and the destination node C can communicate with the destination node C through the application layer protocol.

The self-adaptive dynamic routing protocol, that is DRP protocol, may involve at least the following messages:

REQ_DES_DEVICE, the routing request message, is initiated by any node to locate the device that needs communication, and notify relevant nodes to configure the network according to the message; the fields include token, message type, device serial number at the destination node, device serial number at the source node, device IP of the source node, serial number of the device sending the message and device serial number at the intermediate node that the message passes; there can be more than one device serial numbers at the intermediate node that the message passes;

REQ_DEVICE_ROUTE, the message of obtaining the connection state sheet, is to obtain the port connection state sheet of a device; the fields include token, message type, serial number of the device sending the message, and device serial number at the destination node; there can be more than one device serial numbers at the destination node;

DEVICE_DISCONNECT, the device disconnection message, can be initiated by any node to prompt a device disconnection; the fields include token, message type, serial number of the device sending the message, device serial number at the source node, device IP of the source node, device serial number at the destination node, and device IP of the destination node;

ROUTE_CONF, the routing confirmation message, can be initiated by any node to allow the specified device to configure its own network and routing sheet; the fields include token, message type, serial number of the device sending the message, device serial number at the source node, device IP of the source node, device serial number at the destination node, device IP of the destination node and port number of the destination node;

ROUTE_READY, the routing completion message, is initiated by a forwarding node to remind other devices that the node has completed the network routing configuration; the fields include token, message type, serial number of the device sending the message, device serial number at the source node, device IP of the source node, device port number of the source node, device serial number at the destination node, device IP of the destination node and device port number of the destination node;

REQ_DEVICE_BY_RES, the resource request message, is to query the node that can provide specific file resources; the fields include token, message type, serial number of the device sending the message, device serial number at the source node, device IP of the source node, file ID, and device serial number at the intermediate node;

RESP_DEVICE_ROUTE, the message of responding connection state sheet, is initiated by any node and returns the connection state sheet of the corresponding device; the fields include token, message type, serial number of the device sending the message, device serial number at the source node, device IP of the source node, device port number of the source node and device network interface list; the device network interface list contains the network interface type, IP address, serial number of the device connecting to the network interface, and the IP address of the connected device;

NO_REQ_ENDPOINT, the endpoint message, is initiated by any node to indicate that the node is a leaf node or an endpoint, and no other node is connected to the node; the fields include token, message type, serial number of the device sending the message, device serial number at the source node and device serial number at the destination node;

RESP_FAIL, the establishment failure message; the fields include token, message type, serial number of the device sending the message, device serial number at the source node, device serial number at the destination node, and failure error code.

Figure 3:
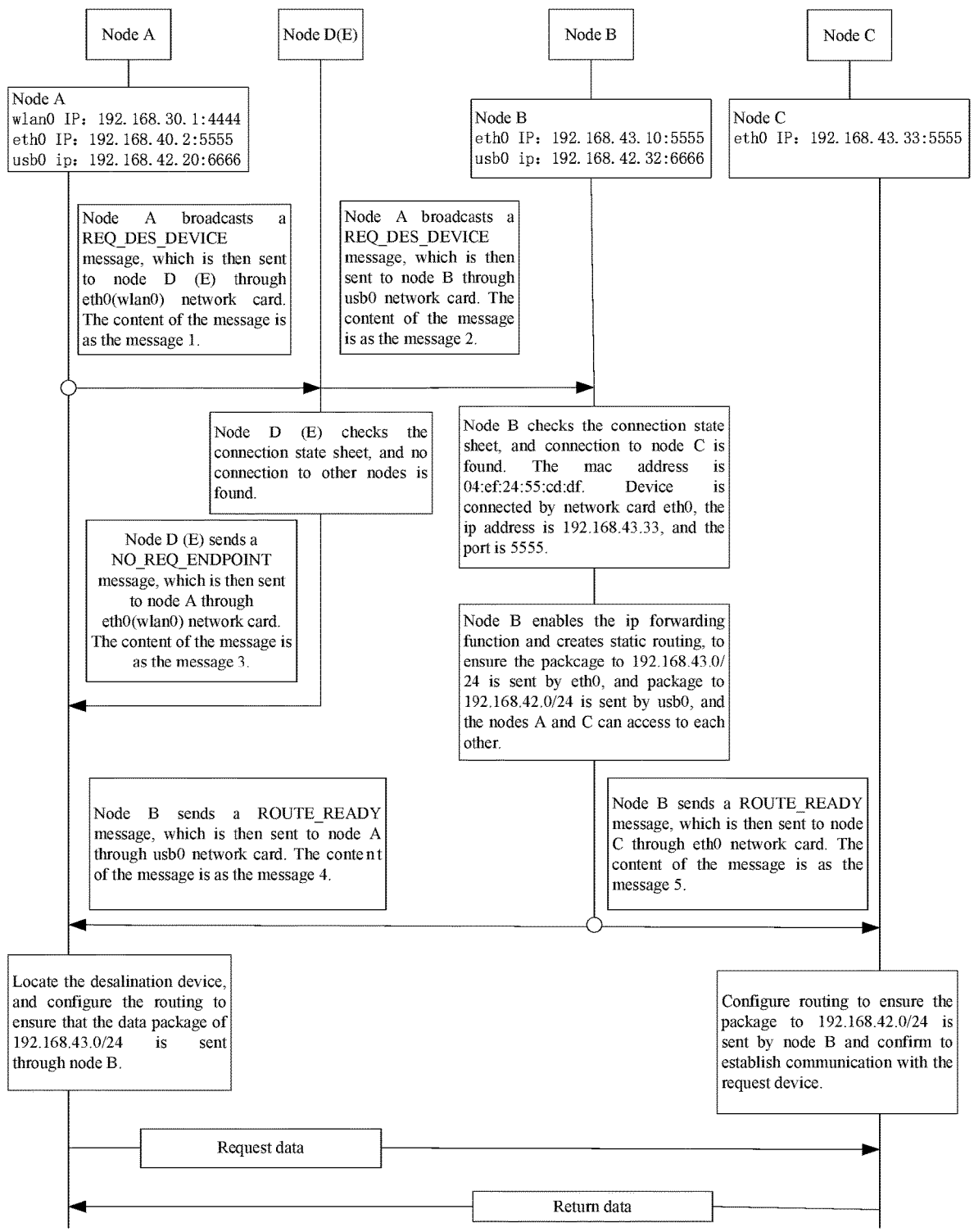
FIG. 3 is a process diagram of establishing connection between two devices in embodiment 1 of the present invention.

The process of establishing a connection between the source node A and the destination node C in the embodiment 1 is shown in FIG. 3.

Figure 4:
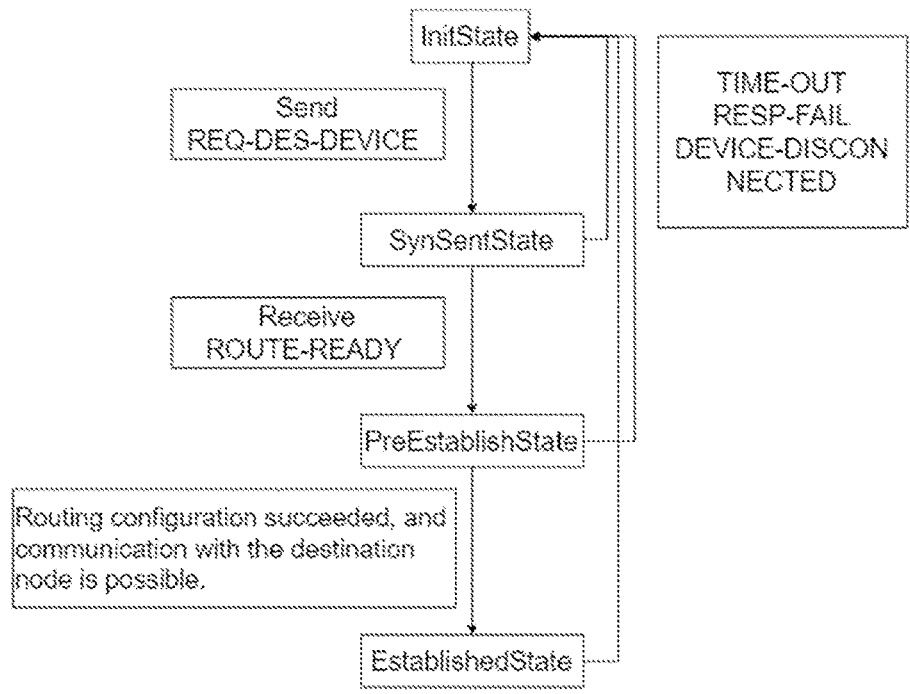
FIG. 4 is a state flow process diagram of the source node state machine in embodiment 1 of the present invention.

A session is initiated by REQ_DES_DEVICE message. The state flow process of the state machine unit of the source node A is shown in FIG. 4. InitState, SynSentState, PreEstablishState and EstablishedState are several different states of the state machine unit, indicating initial state, sent request state, pre-established state and established state. Different types of messages are processed in different states. TIME_OUT, RESP_FAIL and DEVICE_DISCONNECTED are the return values in the process of state transition, indicating timeout, establishment failure and device disconnection respectively.

Figure 5:
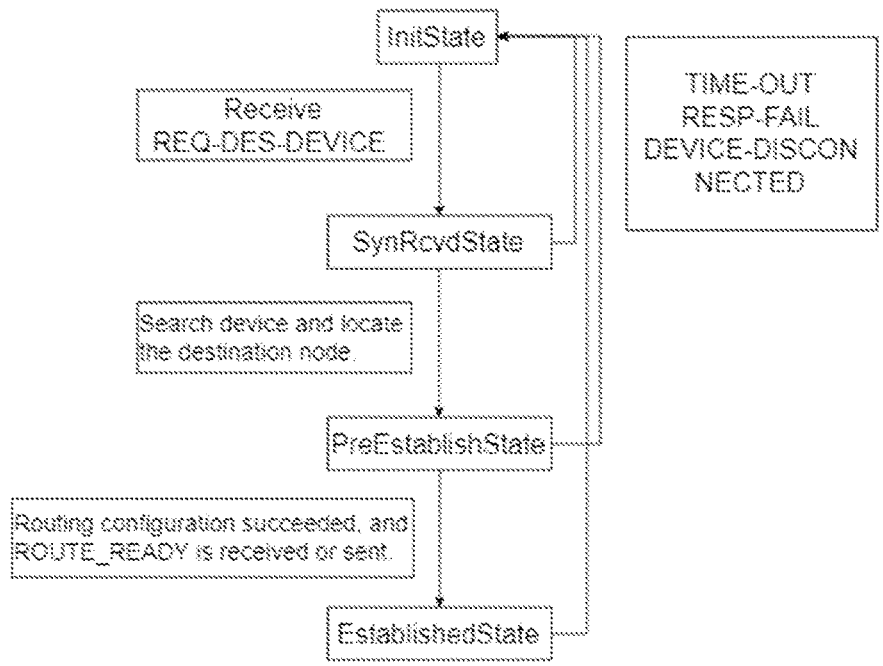
FIG. 5 is a state flow process diagram of the intermediate node state machine in embodiment 1 of the present invention.

A session is initiated by REQ_DES_DEVICE message. The state flow process of the state machine unit of the intermediate node B is shown in FIG. 5. SynRvcdState indicates the received request state.

Figure 6:
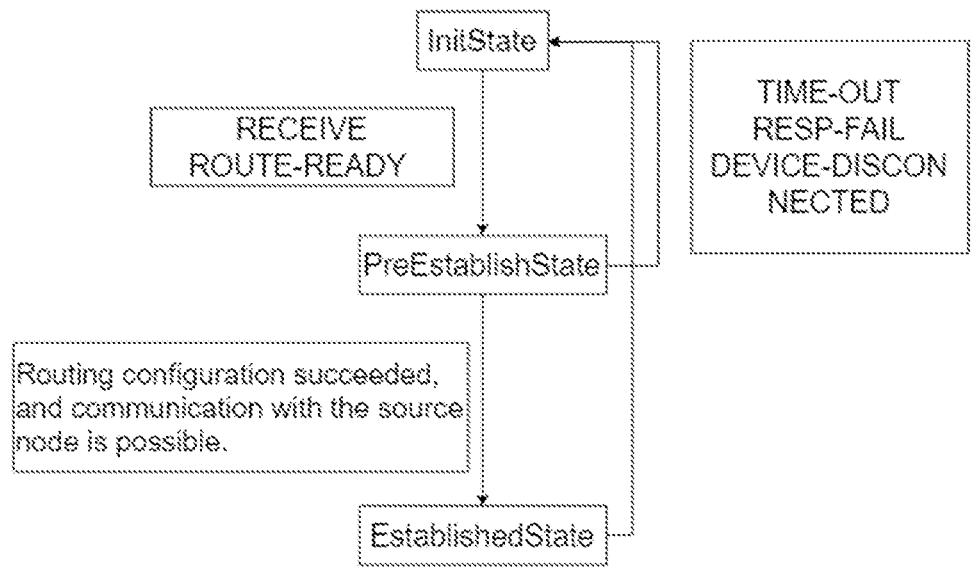
FIG. 6 is a state flow process diagram of the destination node state machine in embodiment 1 of the present invention.

A session is initiated by REQ_DES_DEVICE message. The state flow process of the state machine unit of the destination node C is shown in FIG. 6.

Embodiment 2

Figure 7:
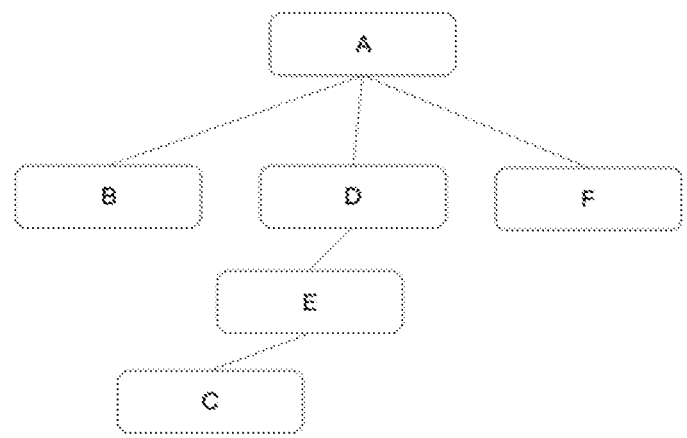
FIG. 7 is a topological structure diagram of LAN in embodiment 2 of the present invention.

The difference between the method used in this embodiment and that in embodiment 1 lies in that two or more forwarding nodes exist between the source node A and the destination node C. The device serial number at the destination node C is known as 34762ab641c347e1. The connection of each node is shown in FIG. 7, in which the source node A, the intermediate nodes D and E, the destination node C, and the leaf nodes B and E are all PCs supporting DRP self-adaptive dynamic routing protocol, the device serial number at the source node A is 64672ab641c647ec, and the device serial number at the intermediate node D is 65322ca531ca46ec, and the device serial number at the intermediate node E is 56452ba531ca4625;

the source node A and the intermediate node D are connected through Ethernet cable. The IP of Ethernet port of the source node A is 192.168.40.2, and the port number is 5555; the IP of Ethernet port of the intermediate node D connected to the node A is 192.168.40.1 and the port number is 5555;

the USB interfaces of the intermediate node D and the intermediate node E are connected with a USB wireless network card. A LAN connection is established between the intermediate node D and the intermediate node E through the wireless network card by using the method of the prior art. The IP address of the USB wireless network card of the intermediate node D is 192.168.42.22 and the port number is 6666; the IP address of the USB wireless network card of the intermediate node E connected to the node D is 192.168.42.20 and the port number is 6666;

the intermediate node E and the destination node C are connected through Ethernet cable. The IP address of Ethernet port of the intermediate node E is 192.168.43.2 and the port number is 5555; the IP address of Ethernet port of the destination node C connected to the node E is 192.168.43.33 and the port number is 5555;

the source node A and the leaf node B are connected through WLAN, and the source node A and the leaf node E are connected through LAN established by setting a USB wireless network card. The IP address of the WLAN port of the source node A is 192.168.30.1, and the port number is 4444; the IP address of the USB wireless network card of the source node A is 192.168.60.20, and the port number is 6666;

the routing from the source node A to the destination node C is established in the following steps:

S401, the source node A initiates a message broadcast in the form of a REQ_DES_DEVICE message, which includes the device serial number at the destination node C, and the device serial number and IP address of the source node A; the message is transmitted to the next nodes B, D and F connected to the source node A through its network interfaces; the specific contents of the above REQ_DES_DEVICE message are as follows, in which src_ip of src_device varies as different ports of the source node that sends the broadcast;

---

{"message": {"token": "24853a3851b347d2", "type": "REQ_DES_DEVICE",
"des_device": {"des_sn": "34762ab641c347e1"},
"src_device": {"src_sn": "64672ab641c647ec", "src_ip": "192.168.30.1"}, "sn": "64672ab641c647ec"}}
{"message": {"token": "24853a3851b368c4", "type": "REQ_DES_DEVICE",
"des_device": {"des_sn": "34762ab641c347e1"},
"src_device": {"src_sn": "64672ab641c647ec", "src_ip": "192.168.40.2"} "sn": "64672ab641c647ec"}}.

---

S402, the nodes B, D and F, after receiving the broadcast, search the destination node C in their connection state sheets. The nodes B and F are leaf nodes without other endpoint connections. The leaf nodes B and F send endpoint message NO_REQ_ENDPOINT to the source node. The specific contents of the NO_REQ_ENDPOINT message are as follows, in which "sn" varies as different serial number of the device sending the message:

```
{"message": {"token": "24853a3851b3472a", "type": "NO_REQ_ENDPOINT",
"des_device": {"des_sn": "34762ab641c347e1"},
"src_device": {"src_sn": "64672ab641c647ec"}, "sn": "43682bc522c647da"}}.
```

The intermediate node D, after receiving the routing request message REQ_DES_DEVICE, searches its own connection state sheet, if no connection to the destination node C is found, re-establishes the original REQ_DES_DEVICE message, fills the device serial number at the intermediate node D into the message, and then forwards the message to the nodes connected to other network interfaces of the intermediate node D. The contents of the forwarded REQ_DES_DEVICE message are as follows:

```
{"message": {"token": "24853a3851b3a481", "type": "REQ_DES_DEVICE",
"des_device": {"des_sn": "34762ab641c347e1"},
"src_device": {"src_sn": "64672ab641c647ec", "src_ip": "192.168.40.2"}, "sn": "65322ca531ca46ec"}, "node1": {"node1_sn": "65322ca531ca46ec"}}}.
```

S403, the node E searches its own connection state sheet and finds that a connection to the destination node C exists in its connection state sheet. As an intermediate node, node E configures the routing according to the method described in embodiment 1, and configures the port and IP reaching the IP network segment of the destination node C, and the next-hop IP and port reaching the IP network segment of the source node A, so that the two network interfaces connecting the destination node C and the intermediate node D realize data forwarding. The intermediate node E will send a routing confirmation message ROUTE_CONF after routing configuration to the previous intermediate node D in the direction of the source node. The message contains the network configuration information of the destination node C, the device serial number, IP and port number of the destination node C, the device serial number and IP of the source node A, and the serial number of the device sending the message. The specific contents of the above routing confirmation message ROUTE_CONF are as follows:

```
{"message": {"token": "24853a3851b3d473", "type": "ROUTE_CONF", "sn": "56452ba531ca4625",
"src_device": {"src_sn": "64672ab641c647ec", "src_ip": "192.168.40.2"},
"des_device": {"des_sn": "34762ab641c347e1",
"des_ip": "192.168.43.33", "des_port": "5555"}}}.
```

S404, the intermediate node D directly connected to the source node, after receiving the routing confirmation message ROUTE_CONF, configures the routing according to the method described in embodiment 1, and configures the next-hop IP and port reaching the IP network segment of the destination node C and the port and IP reaching the source node A, so that the source node A can communicate with the intermediate node E. After the intermediate node D completes network configuration, it will send a ROUTE_READY message to the source node A and the intermediate node E in the direction of the destination node. The ROUTE_READY message contains the device serial number, IP and port of the source node A, and the device serial number, IP and port of the destination node C. The specific contents of the ROUTE_READY message are as follows:

```
{"message": {"token": "24853a3851b3a481", "type": "ROUTE_READY", "sn": "65322ca531ca46ec"},
"src_de vice": {"src_sn": "64672ab64 1 c647ec", "src_ip": "192.168.40.2",
"port": "5555"}, "des_device": {"des_sn": "14324ab531ba46ad",
"des_ip": "192.168.43.33", "des_port": "5555"}}}
{"message": {"token": "24853a3851b314a2", "type": "ROUTE_READY", "sn": "65322ca531ca46ec"},
"src_de vice": {"src_sn": "64672ab64 1 c647ec", "src_ip": "192.168.40.2",
"port": "5555"}, "des_device": {"des_sn": "34762ab641c347e1",
"des_ip": "192.168.43.33", "des_port": "5555"}}.
```

S405, the source node A configures the routing according to the information in the ROUTE_READY message, and configures the next-hop IP and port reaching the IP network segment of the destination node C; after receiving the ROUTE_READY message, the intermediate node E will forward it to the destination node C, and the message will contain the network configuration information of the source node A. The specific contents of the ROUTE_READY message are as follows:

```
{"message": {"token": "24853a3851b3a2d1", "type": "ROUTE_READY", "sn": "56452ba531ca4625"},
"src_device": {"src_sn": "64672ab641c647ec", "src_ip": "192.168.40.2", "port": "5555"},
"des_device {"des_sn": "34762ab641c347e1", "des_ip": "192.168.43.33", "des_port": "5555"}}.
```

S406, the destination node C will configure the routing according to the information in the ROUTE_READY message, and configures the next-hop IP and port reaching the IP network segment of the source node A to ensure that network communication can be established with the source node A.

Figure 8:
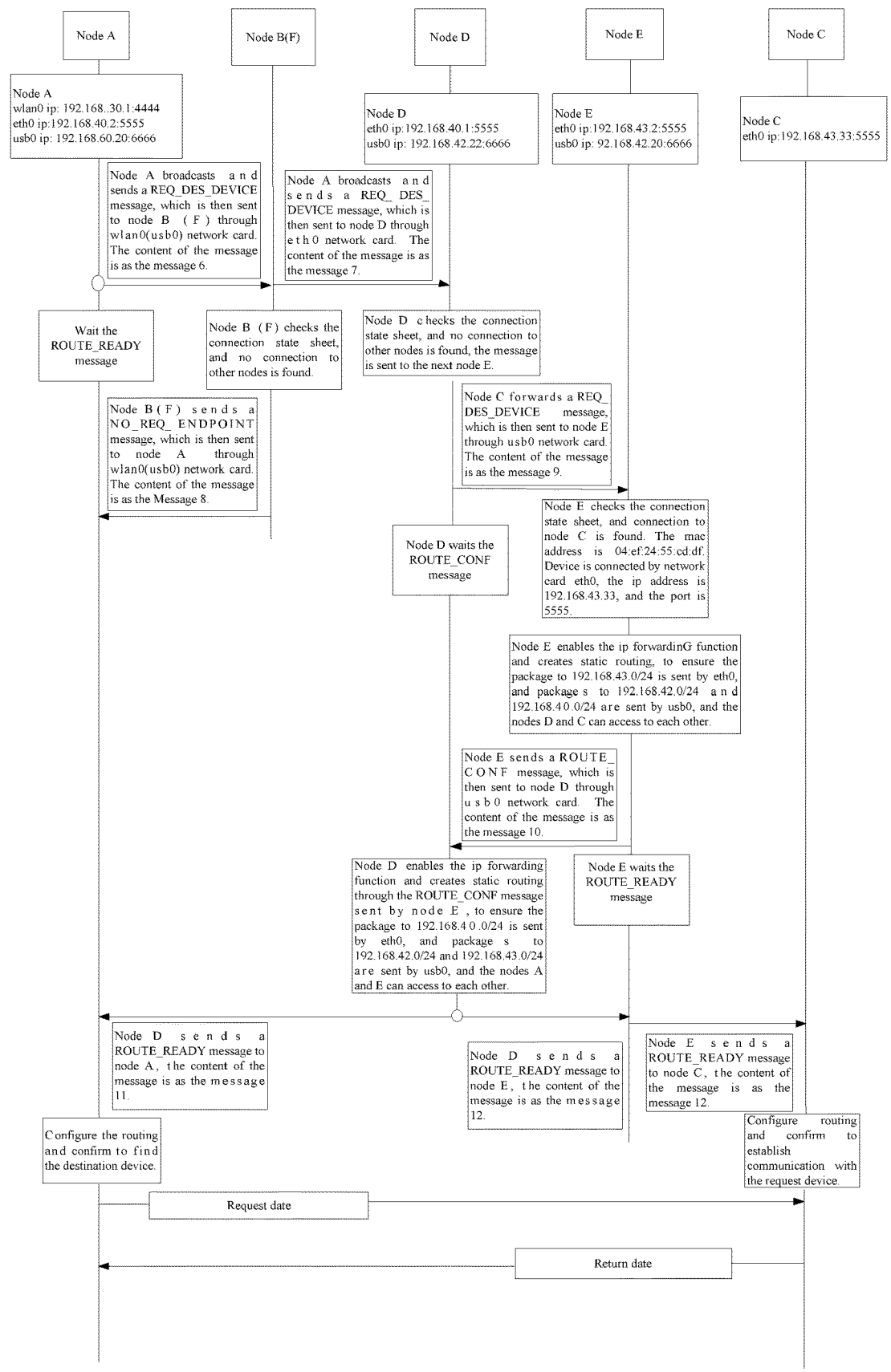
FIG. 8 is a process diagram of establishing connection between two devices in embodiment 2 of the present invention.
Figure 9:
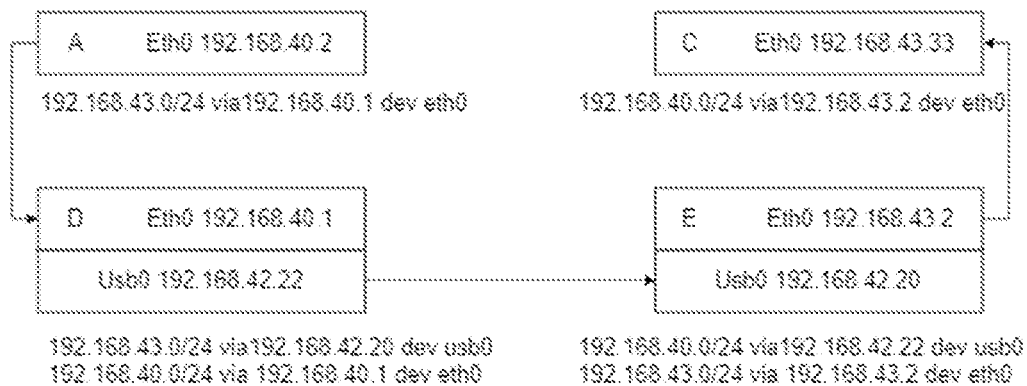
FIG. 9 is a schematic diagram of routing configuration for each node after the connection is established in embodiment 2 of the present invention.

The process of establishing a connection between the source node A and the destination node C in this embodiment is shown in FIG. 8, and the routing method of the above nodes is shown in FIG. 9.

This embodiment can also be extended to the case where there are more than two intermediate nodes between the source node A and the destination node C. The steps of establishing a routing are similar to S401-S406;

specifically, in S402, if no connection to the destination node is found, the intermediate node will fill its own serial number into the message, and then forward it to the nodes connected to other network interfaces of the intermediate node. After receiving the routing request message, other nodes as an intermediate node also implement this step and continue forwarding;

specifically, in S403, if connection to the destination node is found in the connection state sheet, the intermediate node directly connected with the destination node configures its own routing, and sends the routing confirmation message ROUTE_CONF to the previous intermediate node in the direction of the source node, and the previous intermediate node also forwards the message to the previous intermediate node in the direction of the source node, until the intermediate node directly connected with the source node receives the routing confirmation message. After that, S404 is proceeded; specifically, in S404, the intermediate node directly connected to the source node configures its own routing and sends the route completion message ROUTE_READY to the source node A and the intermediate node in the direction of the destination node. The intermediate node continues to forward the message until the destination node receives the routing completion message. After that, S405 is proceeded. Theoretically, there is no limit to the number of intermediate nodes, but according to the actual circumstance and considering the delay and network stability, the number cannot be too large.

Embodiment 3

The difference between the method used in this embodiment and that in embodiment 1 lies in that this embodiment implements the method by which a source node sends a file request through broadcast, an intermediate node forwards the request and locates a destination node containing a destination file, and then each node configures its own routing and establishes the routing from the source node to the destination node or the destination node containing the destination file. As shown in FIG. 2, the source node C requests a file with known file ID, and it is necessary to locate the destination node A containing the destination file and establish routing.

The DRP Service daemon of each node in embodiment 1 creates a resource management unit in addition to the state machine unit, the interface connection monitoring unit and the token management unit. The resource management unit creates and maintains a shared resource list to save the specific information of the file shared over the network by the node device, including the unique file ID and path. The unique file ID is the hash code of the file.

The destination file ID is known as 47901c23a540a12a, in which the source node C, the intermediate node B, the destination node A, and the leaf nodes B and E are all PCs supporting DRP self-adaptive dynamic routing protocol, the device serial number at the source node C is 34762ab641c347e1, and the device serial number at the intermediate node B is 54671ad641aa58ce;

the source node C and the intermediate node B are connected through Ethernet cable. The IP of Ethernet port of the source node C is 192.168.43.33, and the port number is 5555; the IP of Ethernet port of the intermediate node B connected to the node C is 192.168.43.10 and the port number is 5555;

the USB interfaces of the intermediate node B and the destination node A are connected with a USB wireless network card. A LAN connection is established between the intermediate node D and the intermediate node E through the wireless network card by using the method of the prior art. The IP address of the USB wireless network card of the intermediate node B is 192.168.42.32 and the port number is 6666; the IP address of the USB wireless network card of the destination node A connected to the node B is 192.168.42.20 and the port number is 6666;

the routing from the source node C to the destination node A is established in the following steps:

S501, the source node C generates and broadcasts a resource request message REQ_DEVICE_BY_RES, which includes the token, message type, serial number of the device sending the message, device serial number at the source node, device IP of the source node, and the requested file ID as described in embodiment 1; in the token, the session ID uses the requested file ID, i.e., the hasdecode (file), to replace the unknown device serial number at the destination node. The token is calculated as follows:

Token=substring12(MD5(MD5(userID+passwd)+src_sn+hasdecode(file)))+R(timestamp);

The specific contents of the above resource request message REQ_DEVICE_BY_RES are as follows:

```
{"message":
{"token":         "64636a2442cda2e1",       "type":
"REQ_DEVICE_BY_RES",
"sn":    "34762ab641c347e1",   "src_device":   {"src_sn":
"34762ab641c347e1",
"src_ip": "192.168.43.33"},
"res": "47901c23a540a12a"}}.
```

S502, the intermediate node B searches its own shared resource list, if no hashcode of the destination resource file is found, includes its own device serial number into the resource request message, and forwards the REQ_DEVICE_BY_RES message to the node A connected with the intermediate node B; the specific contents of the resource request message REQ_DEVICE_BY_RES are as follows:

```
{"message":
{"token":         "64636a2442cd12b1",       "type":
"REQ_DEVICE_BY_RES",
"sn":   "54671ad641aa58ce",   "node1":   {"node1_sn":
"54671ad641aa58ce"}
"src_device": {"src_sn": "34762ab641c347e1",
"src_ip": "192.168.43.33"},
"res": "47901c23a540a12a"}}.
```

S503, the node A searches its own shared resource list, if destination resource file is found, writes the device serial number, IP and port of the destination node A containing the destination resource file and device serial number at the source node C into the routing confirmation message ROUTE_CONF, and sends the message to the previous intermediate node B in the direction of the source node, the specific contents of the above routing confirmation message ROUTE_CONF are as follows:

```
{"message":  {"token":   "64636a2442cd12ed",   "type":
"ROUTE_CONF",
"sn":   "64672ab641c647ec",   "src_device":   {"src_sn":
"34762ab641c347e1",
"src_ip": "192.168.43.33"},
"des_device": {"des_sn": "64672ab641c647ec", "des_ip":
"192.168.42.20", "des_port": "6666"}}}.
```

S504, the intermediate node B connected to the source node C, after receiving the routing confirmation message ROUTE_CONF, configures its own routing, sets the port and IP reaching the destination node A and the port and IP reaching the source node C, enables the network forwarding function, and sends a routing completion message ROUTE_READY to the source node C and the destination node A. The message contains the device serial number, port and IP of the destination node A and the device serial number, port and IP of the source node C;

The specific contents of the above routing completion message ROUTE_READY are as follows:

```
{"message": {"token": "64636a2442cd5625", "type":
"ROUTE_READY",
"src_device": {"src_sn": "34762ab641c347e1", "src_ip":
"192.168.43.33", "src_port": "5555"},
"des_device": {"des_sn": "64672ab641c647ec", "des_ip":
"192.168.42.20", "des_port": "6666"}, "sn": "54671ad641aa58ce"}}
{"message": {"token": "64636a2442cd5d24", "type":
"ROUTE_READY",
"src_device": {"src_sn": "34762ab641c347e1", "src_ip":
"192.168.43.33", "src_port": "5555"},
"des_device": {"des_sn": "64672ab641c647ec", "des_ip":
"192.168.42.20", "des_port": "6666"}, "sn": "54671ad641aa58ce"}}.
```

S505, after the source node C and the destination node A receive the routing completion message ROUTE_READY, the source node C configures its own routing, and configures the next-hop port and IP reaching the network segment of the destination node A to ensure network communication with the destination node A and obtain the desired file. The process of establishing a routing is thus completed.

Figure 11:
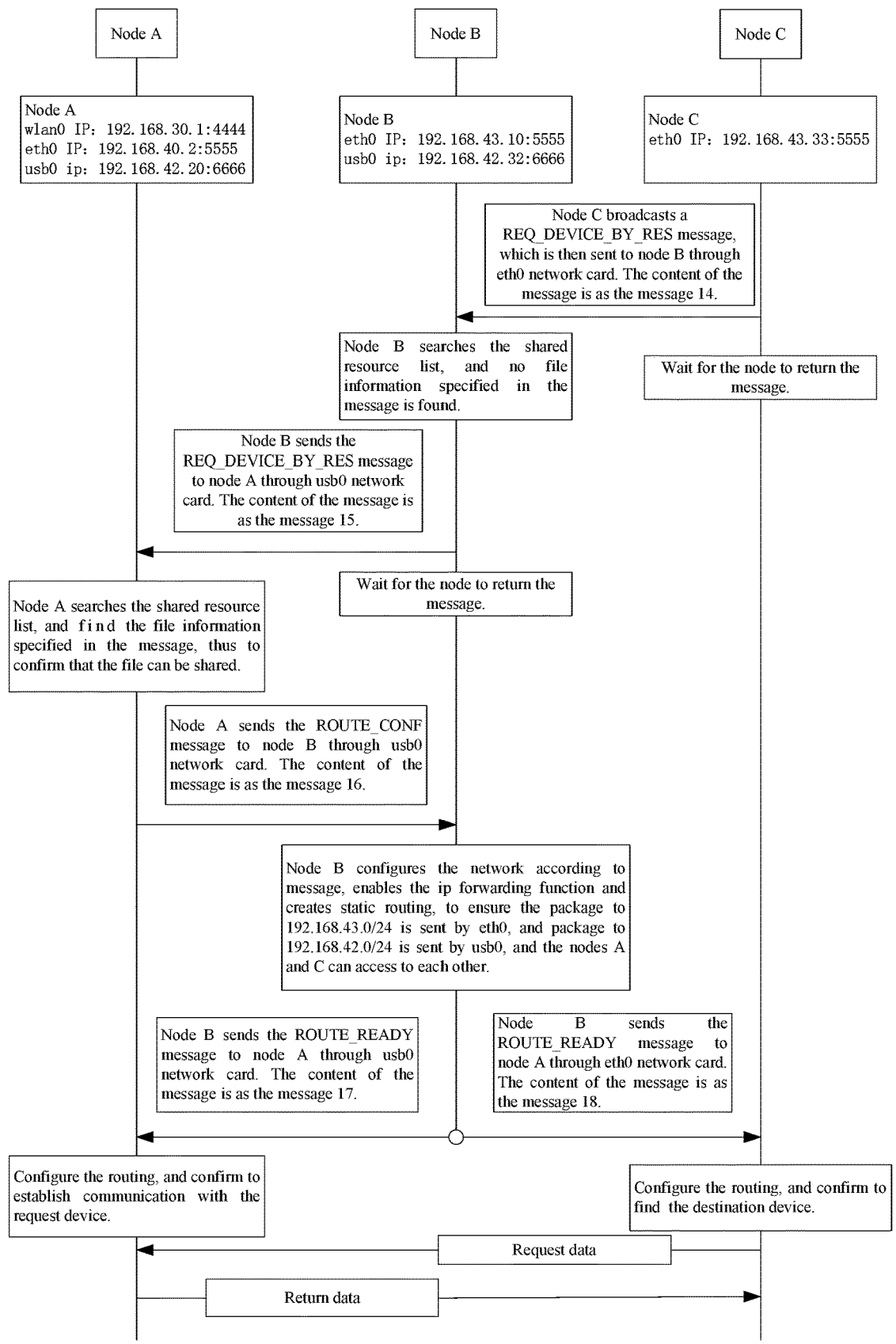
FIG. 11 is a process diagram of establishing connection between two devices in embodiment 3 of the present invention

The embodiments 1 and 2 have described the above-mentioned method for configuring one's own routing, which will not be illustrated here. The process of establishing connection is as shown in FIG. 11.

Embodiment 4

The difference between the method used in this embodiment and that in embodiment 1 lies in the method for selecting routing when multiple paths are available between the source node A and the destination node C. The method is detailed as follows: for the same request message of the same session, the state machine of any node processes the earlier message and discards the later one; the less time-consuming path is selected. Taking the connection mode in FIG. 10 as an example, two paths (A-B-C, A-D-C) are available between the source node A and the destination node C. After the source node A sends a REQ_DES_DEVICE message, both the intermediate nodes B and D receive the message, detect connection to the destination node C in their own connection state sheets, and then send a ROUTE_READY message to the source node A and the destination node C. But the intermediate node B sends the message 10 seconds earlier than the intermediate node D, so after receiving the same type of the request message ROUTE_READY of the same session from the intermediate node B or D, the source node A and the destination node C judge from the timestamp in the message token. If the time difference of the messages falls within the specified range (for example, 30 s), the source node A and the destination node C will process the earlier ROUTE_READY message sent by the intermediate node B and discard the later one sent by the intermediate node D, thus establishing the less time-consuming path: A-B-C.

Embodiment 5

Figure 10:
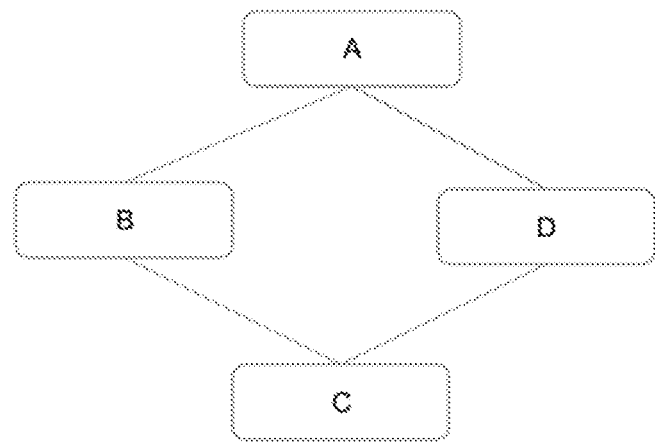
FIG. 10 is a topological structure diagram of LAN in embodiment 4 of the present invention.

After routing is established in embodiment 4, as shown in FIG. 10, when the destination node C that constitutes the routing A-B-C is disconnected, the node B directly connected to the destination node C detects through hardware that the destination node C is disconnected, and then broadcasts a device disconnection message DEVICE_DISCONNECT;

the device disconnection message DEVICE_DISCONNECT contains the token, message type, device serial number at the source node, IP of the source node, device serial number at the destination node, IP of the destination node, and device serial number of node sending the message;

after receiving the device disconnection message DEVICE_DISCONNECT, the source node A re-establishes the routing to the destination node C according to the method described in embodiment 1.

One or more embodiments described herein involve computer memory products that have the non-temporary computer readable media (also called the non-temporary processor readable media) used to execute the instructions for operations realized by a computer or computer codes. The computer readable media (or processor readable media) are non-temporary, and thus does not include temporary transmission signal (for example, transmission electromagnetic wave carrying information on the transmission media such as space and cable). The media and computer codes (also called codes or algorithms) can be a code or algorithm designed and constructed for specific purpose. The embodiments of non-temporary computer readable media include but are not limited to magnetic media, such as hard disk, floppy disk and tape; optical media, such as CD/DVD, CD-ROM and holographic devices; magneto-optic memory media, such as optical discs; carrier signal processing modules; and hardware configured for storing and executing program codes, such as ASIC, PLD, ROM and RAM. Other embodiments described herein involve computer program products, which include the instructions and/or computer codes disclosed herein.

One or more embodiments and/or methods described herein can be executed by software (executed on hardware), hardware or the combination thereof. The hardware modules include universal processors (or microprocessors or controllers), FPGA and/or ASIC. The software modules (executed on hardware) can be expressed by multiple software languages (such as computer codes), including C, C++, Java®, Ruby, Visual Basic®, and/or other object- and process-oriented or other programming languages and development tools. The embodiments of computer codes include but are not limited to codes or instructions, machine instructions generated by a compiler, codes used for generating webpage services and documents comprising higher-level instructions executed by a computer using an interpreter. Other embodiments of computer codes include but are not limited to control signals, encrypted codes and compressed codes.

It should be understood that the embodiments described above are some embodiments rather than limitations of the invention. Although the above methods indicate that some events happen in a certain order, such order can be changed. In addition, some events can be executed at the same time if possible, and in the order as mentioned above.

What is claimed is:

1. A dynamic routing method supporting dynamic self-adaptive network configuration for LAN, wherein,
a source node generates and broadcasts a resource request message containing a destination file ID, and an intermediate node forwards the message and locates a destination node containing the destination file, to establish a routing from the source node to the destination node containing the destination file;
the intermediate node includes at least two network interfaces and is connected to at least two nodes through the network interfaces;
if multiple paths are available between the source node and the destination node, for a same request message, one node will process the earlier message and discard the later one;
when routing is successfully established, a node forming the routing, if disconnected, will send a disconnection reminder and re-establish a new routing between the source node and the destination node; wherein,
the intermediate node forwards the message and locates the destination node in the following steps:
S101, after receiving the routing request message, the intermediate node searches its own connection state sheet, if no destination node is found, adds the serial number information of its own device, and forwards the routing request message to other nodes connected to the intermediate node, or sends endpoint message to the source node if no other nodes are connected to the intermediate node; the connection state sheet includes the IP address and MAC address of each network port of a current node, and the device serial number and IP address of the node connected to each port;
S102, if a destination node is found when an intermediate node searches its own connection state sheet, the intermediate node configures its own routing and sends a routing confirmation message to a previous intermediate node in the direction of the source node;
S103, the previous intermediate node receives the routing confirmation message, configures its own routing, and forwards the message to a previous intermediate node in the direction of the source node;
S104, when an intermediate node in connection with the source node receives the routing confirmation message, it configures its own routing and sends routing completion message to the source node and an intermediate node in the direction of the destination node, and the intermediate node in the direction of the destination node forwards the routing completion message, until the destination node receives the routing completion message;
S105, after receiving the routing completion message, the source node and the destination node configure their own routing;
in the steps of the intermediate node forwarding the message and locating the destination node, if routing establishment fails due to an error, a node with error will send an establishment failure message.

2. The dynamic routing method supporting dynamic self-adaptive network configuration for LAN according to claim 1, wherein, the intermediate node forwards the message and locates the destination node containing the destination file in the following steps:
S201, after receiving the resource request message, the intermediate node searches its own shared resource list, if no destination file is found, adds the serial number information of its own device, and forwards the resource request message;
S202, if a destination file is found when it searches its own shared resource list, the node is the destination node, and the network information of the destination node, the intermediate node, and the source node is written into a routing confirmation message and sent to the previous intermediate node in the direction of the source node;
S203, the intermediate node receives the routing confirmation message, configures its own routing, and forwards the message to the previous intermediate node;
S204, when an intermediate node in connection with the source node receives the routing confirmation message, it configures its own routing and sends routing completion message to an intermediate node in the direction of the source node and the destination node, the intermediate node forwards the message, until the destination node receives the routing completion message;
S205, after the source node and the destination node receive the routing completion message, the source node configures its own routing to ensure network communication with the destination node and obtain the desired file.

3. The dynamic routing method supporting dynamic self-adaptive network configuration for LAN according to claim 2, wherein, the shared resource list includes the unique file ID and path of the file shared over the network by the node, the unique file ID is the hash code of the file, and the resource request message is REQ_DEVICE_BY_RES, which contains the token, type, identification of the file under resource request, device serial number at the source node, IP address of the source node, serial number of the device sending the message and device serial number at the intermediate node that the message passes;
the token of resource request message is generated as follows: when a node initiates a file request, a session ID will be generated; the session ID is obtained by taking the first 12 digits of the result of hash calculation for a text concatenated by an intermediate value obtained from md5 algorithm of the user ID and password with the device serial number at the source node and the destination file ID; the token is obtained by concatenating the session ID and the timestamp, in which the first 12 digits are the session ID, and last 4 can be obtained from a reversible calculation for the timestamp.

4. The dynamic routing method supporting dynamic self-adaptive network configuration for LAN according to claim 3, wherein, the step of sending the disconnection reminder and re-establishing the new routing between the source node and the destination node is as follows:
when the source node detects through heartbeat that the destination node is no longer reachable, it actively broadcasts a device disconnection message, and implements the step of the intermediate node forwarding the message and locating the destination node, or implements the step of the intermediate node forwarding the message and locating the destination node containing the destination file to re-establish routing; or when a node in direct connection with the disconnected node detects through heartbeat or hardware that the destination node is disconnected, it actively broadcasts a device disconnection message; after receiving the broadcast, the source node implements the step of the intermediate node forwarding the message and locating the destination node, or implements the step of the intermediate node forwarding the message and locating the destination node containing the destination file to re-establish routing.

5. The dynamic routing method supporting dynamic self-adaptive network configuration for LAN according to claim 4, wherein, the routing request message is REQ_DES_DEVICE, which contains the token, type, device serial number at the destination node, device serial number at the source node, IP address of the source node, serial number of the device sending the message and device serial number at the intermediate node that the message passes;
the routing confirmation message is ROUTE_CONF, which contains the token, type, device serial number at the destination node, IP address of the destination node, port number of the destination node, device serial number at the source node, IP address of the source node, and serial number of the device sending the message;
the routing completion message is ROUTE_READY, which contains the token, type, device serial number at the destination node, IP address of the destination node, port number of the destination node, device serial number at the source node, IP address of the source node, port number of the source node, and serial number of the device sending the message;
the device disconnection message is DEVICE_DISCONNECT, which contains the token, type, serial number of the device sending the message, device serial number at the destination node, IP address of the destination node, device serial number at the source node, and IP address of the source node;
the endpoint message is NO_REQ_ENDPOINT, which contains the token, type, serial number of the device sending the message, device serial number at the destination node, and device serial number at the source node;
the establishment failure message is RESP_FAIL, which contains the token, type, serial number of the device sending the message, failure error code, device serial number at the destination node, and device serial number at the source node.

6. The dynamic routing method supporting dynamic self-adaptive network configuration for LAN according to claim 5, wherein, each of the source node, the destination node and the intermediate node generates token for the message to be sent and extracts the token of the received message for verification; the token is generated as follows: when a node initiates a session, a session ID will be generated; the session ID is obtained by taking the first 12 digits of the result of hash calculation for a text concatenated by an intermediate value obtained from md5 algorithm of the user ID and password with the device serial number at the source node and the device serial number at the destination node; the token is obtained by concatenating the session ID and the timestamp, in which the first 12 digits are the session ID, and last 4 can be obtained from a reversible calculation for the timestamp;
the verification is implemented as follows: when receiving a message, a device can tell which session it belongs to by comparing the information in the session ID, and determine whether the message exceed the time limit based on the timestamp in the token, thus to determine the validity of the message.

7. The dynamic routing method supporting dynamic self-adaptive network configuration for LAN according to claim 6, wherein, the configuration of one's own routing is as follows: the port reaching the IP network segment of the destination node and the IP address of the port, or the next-hop port reaching the IP network segment of the destination node and the IP address of the next-hop port, and the port reaching the IP network of the source node and the IP address of the port, or the next-hop port reaching the IP network segment of the source node and the IP address of the next-hop port;
the connection state sheet is obtained by sending a message of obtaining the connection state sheet,
the message of obtaining the connection state sheet is REQ_DEVICE_ROUTE, which contains the token, type, serial number of the device sending the message, and device serial number at the destination node; the device under the request of the connection state sheet sends a message of responding connection state sheet to the request node after receiving the message,
the message of responding connection state sheet is RESP_DEVICE_ROUTE, which contains the token, message type, serial number of the device sending the message, device serial number at the source node, device IP address at the source node, device port number at the source node, and device network interface list; the device network interface list contains the network interface type, IP address, serial number of the device connecting to the network interface, and the IP address of the connected device.

8. A LAN unit supporting dynamic self-adaptive network configuration, comprising a physical device and a software system, wherein the physical device supports the network interface, and the software system is equipped with an operating system supporting TCP/IP protocol family and the dynamic routing method supporting dynamic self-adaptive network configuration for LAN according to claim 1.

9. A LAN system supporting dynamic self-adaptive network configuration, wherein, any of the network nodes is the LAN unit supporting the dynamic self-adaptive network configuration according to claim 8.

10. A dynamic routing method supporting dynamic self-adaptive network configuration for LAN, wherein, a source node generates and broadcasts a routing request message containing a device serial number information at a destination node, and an intermediate node forwards the message and locates the destination node, to establish a routing from the source node to the destination node;
the intermediate node includes at least two network interfaces and is connected to at least two nodes through the network interfaces;
if multiple paths are available between the source node and the destination node, for-a same request message, one node will process the earlier message and discard the later one;
when routing is successfully established, a node forming the routing, if disconnected, will send a disconnection reminder and re-establish a new routing between the source node and the destination node; wherein,
the intermediate node forwards the message and locates the destination node in the following steps:
S101, after receiving the routing request message, the intermediate node searches its own connection state sheet, if no destination node is found, adds the serial number information of its own device, and forwards the routing request message to other nodes connected to the intermediate node, or sends endpoint message to the source node if no other nodes are connected to the intermediate node; the connection state sheet includes the IP address and MAC address of each network port of a current node, and the device serial number and IP address of the node connected to each port;

S102, if a destination node is found when an intermediate node searches its own connection state sheet, the intermediate node configures its own routing and sends a routing confirmation message to a previous intermediate node in the direction of the source node;

S103, the previous intermediate node receives the routing confirmation message, configures its own routing, and forwards the message to a previous intermediate node in the direction of the source node;

S104, when an intermediate node in connection with the source node receives the routing confirmation message, it configures its own routing and sends routing completion message to the source node and an intermediate node in the direction of the destination node, and the intermediate node in the direction of the destination node forwards the routing completion message, until the destination node receives the routing completion message;

S105, after receiving the routing completion message, the source node and the destination node configure their own routing;

in the steps of the intermediate node forwarding the message and locating the destination node, if routing establishment fails due to an error, a node with error will send an establishment failure message.

* * * * *